(12) United States Patent
Fredericksen et al.

(10) Patent No.: US 7,994,797 B2
(45) Date of Patent: Aug. 9, 2011

(54) IMPLEMENTING A CODED TIME DOMAIN TRANSMISSION DISTANCE METER

(75) Inventors: Ross T. Fredericksen, Mantorville, MN (US); Edward C. Gillard, Mantorville, MN (US); Don A. Gilliland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 12/432,089

(22) Filed: Apr. 29, 2009

(65) Prior Publication Data

US 2010/0277182 A1 Nov. 4, 2010

(51) Int. Cl.
*G01R 31/11* (2006.01)
*G01R 31/02* (2006.01)

(52) U.S. Cl. .................. 324/533; 324/534; 324/543

(58) Field of Classification Search .................. 324/533, 324/532, 527, 512, 500, 534, 539, 543; 702/127, 702/149, 155, 158; 342/85, 107, 109, 118
See application file for complete search history.

(56) References Cited

U.S. PATENT DOCUMENTS

| | | | | |
|---|---|---|---|---|
| 4,970,467 A * | 11/1990 | Burnett | | 324/637 |
| 6,614,236 B1 * | 9/2003 | Karam | | 324/532 |
| 7,078,912 B2 * | 7/2006 | Han | | 324/534 |
| 7,245,129 B2 * | 7/2007 | Wajcer et al. | | 324/533 |
| 7,808,249 B1 * | 10/2010 | Lo et al. | | 324/543 |
| 7,843,379 B2 * | 11/2010 | Menzer et al. | | 342/118 |
| 7,906,973 B1 * | 3/2011 | Orr | | 324/533 |
| 2007/0069943 A1 * | 3/2007 | Adams et al. | | 342/130 |

* cited by examiner

*Primary Examiner* — Hoai-An D Nguyen
(74) *Attorney, Agent, or Firm* — Joan Pennington

(57) ABSTRACT

A method and circuit for implementing a coded time domain transmission distance meter, and a design structure on which the subject circuit resides are provided. A first transmitter module connected to a cable at a first point or power outlet, generates and sends a testing coded pulse onto the power cable. A second receiver module connected to the cable at a second point, receives the testing coded pulse, and returns a receiver response coded pulse to the transmitter module. The first transmitter module determines the round-trip elapsed time, subtracts a receiver latency time, and calculates a distance to the second receiver module. Encoded in the testing coded pulse are data representing the last calculated distance. Both the first transmitter module and the second receiver module include a display for displaying the calculated distance.

20 Claims, 3 Drawing Sheets

IMPLEMENTING A CODED TIME DOMAIN TRANSMISSION DISTANCE METER

FIELD OF THE INVENTION

The present invention relates generally to the data processing field, and more particularly, relates to a method and circuit for implementing a coded time domain transmission distance meter, and a design structure on which the subject circuit resides.

DESCRIPTION OF THE RELATED ART

A problem exists to determine whether two nearby power outlets are on the same branch circuit. The problem with present methods exists to determine whether two nearby power outlets are on the same branch circuit is that electrically when two branch circuits are connected together at a circuit breaker panel at low frequencies it always appears that the two branch circuits are connected.

Known time domain reflectometry arrangements can determine distances but with many drops and stubs off the low frequency power, the data is not conclusive.

A need exists for an effective mechanism to define a start of a connection to a first power outlet and to determine a distance to a second power outlet that is a tightly defined receive point.

SUMMARY OF THE INVENTION

Principal aspects of the present invention are to provide a method and circuit for implementing a coded time domain transmission distance meter, and a design structure on which the subject circuit resides. Other important aspects of the present invention are to provide such method, circuit and design structure substantially without negative effect and that overcome many of the disadvantages of prior art arrangements.

In brief, a method and circuit for implementing a coded time domain transmission distance meter, and a design structure on which the subject circuit resides are provided. The coded time domain transmission distance meter circuit includes a first transmitter module and a second receiver module. The first transmitter module is connected to a cable at a first point or power outlet. The first transmitter module includes a code generator, and generates and sends a testing coded pulse onto the power cable. The second receiver module is connected to the cable at a second point or power outlet, receives the testing coded pulse, and returns a receiver response coded pulse to the transmitter module. The first transmitter module determines the round-trip elapsed time, subtracts a receiver latency time, and calculates a distance to the second receiver module.

In accordance with features of the invention, by using coded pulses rather than analog pulses the reflections and multiple reflections are ignored. Encoded in the testing coded pulse is information representing the last calculated distance data corresponding to the identified time interval from the last reading. The test sequence loops continuously.

In accordance with features of the invention, both the first transmitter module and the second receiver module include a display. The first transmitter module sends distance data with the testing coded pulse so that the second receiver module can display the distance.

In accordance with features of the invention, a clock in the transmitter continuously runs at a predefined frequency, such as used to calibrate with a velocity factor of the cable. The first transmitter module includes a timer, which is started when a testing coded pulse is sent onto the power cable. The second receiver module receives and checks the testing coded pulse, and if the testing coded pulse is correct, the second receiver module sends a receiver response coded pulse to the first transmitter module. When the first transmitter module receives the receiver response coded pulse, from the second receiver module, the timer is stopped. The first transmitter module checks the receiver coded pulse, and if the receiver coded pulse is correct, uses the elapsed time from the timer to determine the distance. The calculated distance is coded back into the code generator and transmitted in the next testing coded pulse to the receiver module.

In accordance with features of the invention, the testing coded pulse contains the information from the last test and is displayed on both the transmitter and receiver modules. The second receiver module checks the testing coded pulse and when the testing coded pulse is correct, the second receiver module decodes the testing coded pulse and displays the distance.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method and circuit for implementing a coded time domain transmission distance meter, and a design structure on which the subject circuit resides are provided. The coded time domain transmission distance meter circuit includes a first transmitter module and a second receiver module, each using coded pulses so that problems and errors typically resulting with conventional arrangements using analog pulses are eliminated.

Figure 1:
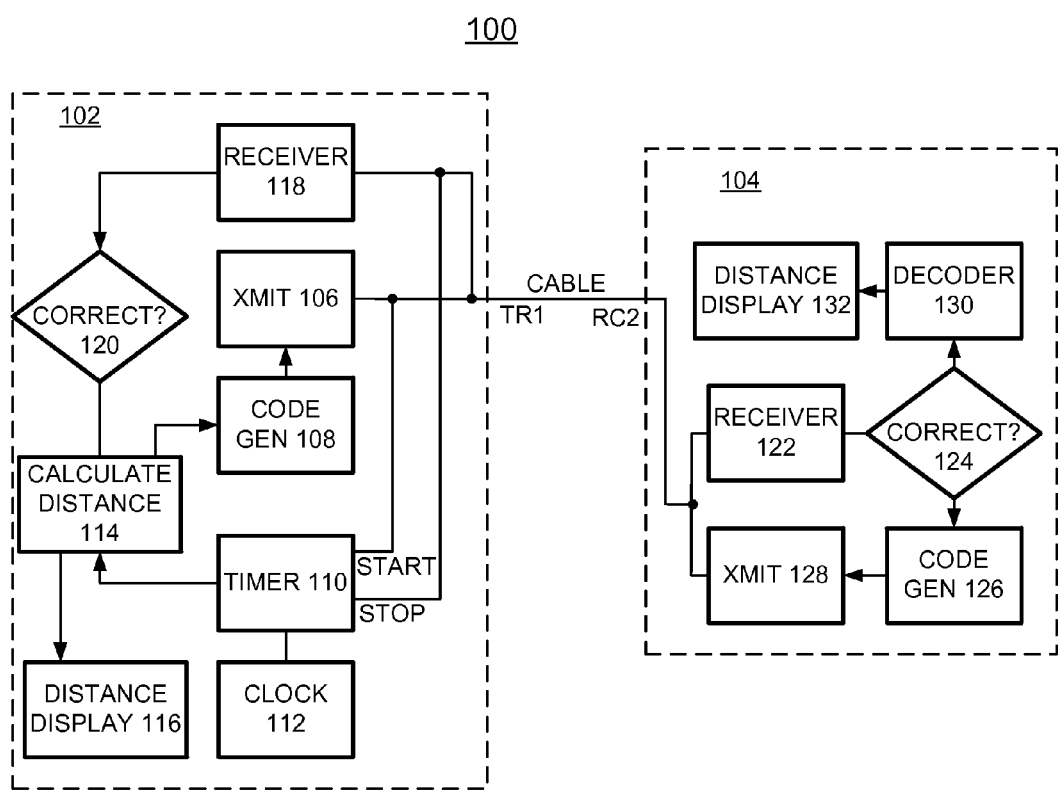
FIG. 1 is a schematic diagram of an exemplary circuit for implementing a coded time domain transmission distance meter in accordance with the preferred embodiment.

Having reference now to the drawings, in FIG. 1, there is shown an exemplary coded time domain transmission distance meter circuit generally designated by the reference character 100 in accordance with the preferred embodiment. Coded time domain transmission distance meter circuit 100 includes a first transmitter module 102 and a second receiver module 104.

The first transmitter module transmitter 106 and is connected to a cable or branch circuit labeled CABLE at a first point or power outlet indicated at a node TR1. The first transmitter module 102 includes a code generator 108 connected to the transmitter 106 for generating and sending a testing coded pulse onto the power cable.

The first transmitter module 102 includes a timer 110 receiving a start input from the transmitter 106 indicated at a line START and receiving a clock input from a clock 112. The timer 110 is connected to a calculate distance function 114 and a display 116 for displaying a calculated distance is connected to the calculate distance function 114.

The first transmitter module 102 includes a receiver 118 connected to the cable at node TR1 receiving a receiver response coded pulse from the second receiver module 104 and applying a stop signal to the timer 110 indicated at a line STOP. The first transmitter module 102 includes a code checking function 120 represented by a decision block labeled CORRECT? The code checking function 120 is connected between the receiver 118 and the calculate distance function 114.

The second receiver module 104 is connected to the cable at a second point or power outlet indicated at a node RC2. The second receiver module 104 includes a receiver 122 receives the testing coded pulse sent by the first transmitter module 102, and selectively returns a receiver response coded pulse to the transmitter module 102.

The second receiver module 104 includes a code checking function 124 represented by a decision block labeled CORRECT? The code checking function 124 is connected a code generator 126. The code generator 126 generates a receiver response coded pulse responsive to an identified valid testing coded pulse by the code checking function 124.

The second receiver module 104 includes a transmitter 128 connected to the code generator 126 and connected to the cable at node RC2 for transmitting the receiver response coded pulse to the transmitter module 102.

The second receiver module 104 includes a decoder 130 connected to the code checking function 124 and connected to a distance display 132. The decoder 130 decodes the identified valid testing coded pulse applied by the code checking function 124. The decoder 130 applies a distance display signal to the distance display 132 responsive to the particular identified valid testing coded pulse applied to the decoder 130 by the code checking function 124.

Figure 2:
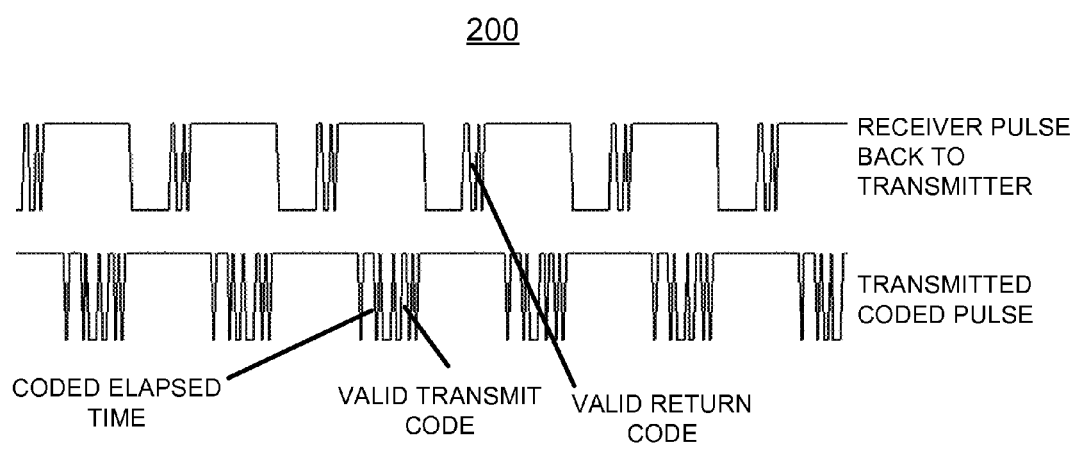
FIG. 2 is a timing diagram illustrating operation of the coded time domain transmission distance meter circuit of FIG. 1 in accordance with the preferred embodiment.

Referring also to FIG. 2, there is shown a timing diagram generally designated by the reference character 100 illustrating operation of the coded time domain transmission distance meter circuit 100 in accordance with the preferred embodiment. The upper waveform labeled RECEIVER PULSE BACK TO TRANSMITTER illustrates the receiver response coded pulse sent to the first transmitter module 102 by the second receiver module 104. The lower waveform labeled TRANSMITTED CODED PULSE illustrates the testing coded pulse sent by the first transmitter module 102 to the second receiver module 104. An example coded elapsed time information and valid transmit code are shown in the waveform TRANSMITTED CODED PULSE. An example receiver response coded pulse sent to the transmitter module 102 is shown in the waveform RECEIVER PULSE BACK TO TRANSMITTER.

In operation, the clock 112 in the first transmitter module 102 continuously runs at a predefined frequency used to calibrate with a velocity factor of the tested cable. The timer 110 is started when the transmitter 106 sends a testing coded pulse onto the power cable. The second receiver module 104 receives and checks the testing coded pulse, and if the testing coded pulse is correct, the second receiver module 104 sends a receiver response coded pulse to the first transmitter module 102. When the first transmitter module 102 receives the receiver response coded pulse from the second receiver module, the timer is stopped. The first transmitter module 102 checks the receiver coded pulse, and if the receiver coded pulse is correct, the calculate distance function 114 uses the elapsed time from the timer 110 to determine the distance.

The calculate distance function 114 of the first transmitter module 102 identifies or determines the round-trip elapsed time from the timer 110, subtracts a predefine receiver latency time, and calculates a distance to the second receiver module 104. The calculated distance is displayed on the distance display 116 and applied to the code generator 108 of the first transmitter module 102.

The first transmitter module 102 provides and sends distance data with a next testing coded pulse so that the second receiver module 104 can display the identified distance between the modules 102, and 104. The calculated distance is coded back into the code generator 108 and transmitted within the next testing coded pulse transmitted by the first transmitter module 102. The testing coded pulse contains the calculated distance information from the last test and is displayed on respective displays 116 and 132 of the transmitter and receiver modules 102, 104.

Figure 3:
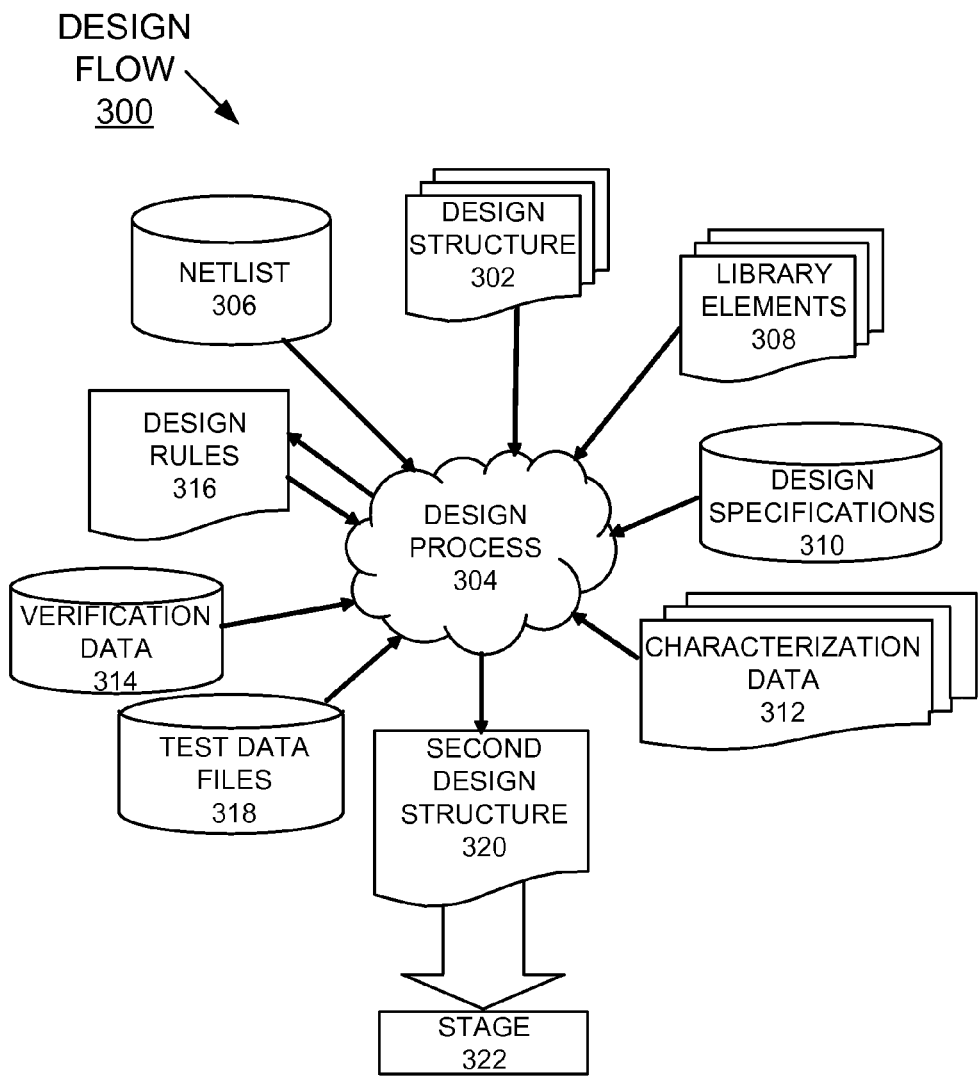
FIG. 3 is a flow diagram of a design process used in semiconductor design, manufacturing, and/or test.

FIG. 3 shows a block diagram of an example design flow 300. Design flow 300 may vary depending on the type of IC being designed. For example, a design flow 300 for building an application specific IC (ASIC) may differ from a design flow 300 for designing a standard component. Design structure 302 is preferably an input to a design process 304 and may come from an IP provider, a core developer, or other design company or may be generated by the operator of the design flow, or from other sources. Design structure 302 comprises circuit 100 in the form of schematics or HDL, a hardware-description language, for example, Verilog, VHDL, C, and the like. Design structure 302 may be contained on one or more machine readable medium. For example, design structure 302 may be a text file or a graphical representation of circuit 100. Design process 304 preferably synthesizes, or translates, circuit 100 into a netlist 306, where netlist 306 is, for example, a list of wires, transistors, logic gates, control circuits, I/O, models, etc. that describes the connections to other elements and circuits in an integrated circuit design and recorded on at least one of machine readable medium. This may be an iterative process in which netlist 306 is resynthesized one or more times depending on design specifications and parameters for the circuits.

Design process 304 may include using a variety of inputs; for example, inputs from library elements 308 which may house a set of commonly used elements, circuits, and devices, including models, layouts, and symbolic representations, for a given manufacturing technology, such as different technology nodes, 32 nm, 45 nm, 90 nm, and the like, design specifications 310, characterization data 312, verification data 314, design rules 316, and test data files 318, which may include test patterns and other testing information. Design process 304 may further include, for example, standard circuit design processes such as timing analysis, verification, design rule checking, place and route operations, and the like. One of ordinary skill in the art of integrated circuit design can appreciate the extent of possible electronic design automation tools and applications used in design process 304 without deviating from the scope and spirit of the invention. The design structure of the invention is not limited to any specific design flow.

Design process 304 preferably translates an embodiment of the invention as shown in FIG. 1 along with any additional integrated circuit design or data (if applicable), into a second design structure 320. Design structure 320 resides on a storage medium in a data format used for the exchange of layout data of integrated circuits, for example, information stored in a GDSII (GDS2), GL1, OASIS, or any other suitable format for storing such design structures. Design structure 320 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1. Design structure 320 may then proceed to a stage 322 where, for example, design structure 320 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A coded time domain transmission distance meter circuit comprising:
    a first transmitter module; said first transmitter module being connected to a cable at a first point;
    said first transmitter module including a first code generator for generating a testing coded pulse and a first transmitter coupled to said first code generator for sending the testing coded pulse onto the cable;
    a second receiver module; said second receiver module being connected to the cable at a second point;
    said second receiver module including a second receiver for receiving the testing coded pulse, a second code generator coupled to said second receiver for generating a receiver response coded pulse and a second transmitter coupled to said second code generator for sending a the receiver response coded pulse to the first transmitter module; and
    said first transmitter module including a calculate distance function for determining a round-trip elapsed time, subtracting a receiver latency time, and calculating a distance to the second receiver module.

2. The coded time domain transmission distance meter circuit as recited in claim 1 wherein said testing coded pulse includes coded information representing the last calculated distance data corresponding to the identified time interval from the last reading.

3. The coded time domain transmission distance meter circuit as recited in claim 1 wherein said first transmitter module includes a first display, said first display for displaying the calculating distance.

4. The coded time domain transmission distance meter circuit as recited in claim 1 wherein said first transmitter module sends distance data information with the testing coded pulse, said second receiver module includes a second display, said second display for displaying the calculating distance.

5. The coded time domain transmission distance meter circuit as recited in claim 1 wherein said first transmitter module includes a clock, said clock continuously runs at a predefined frequency.

6. The coded time domain transmission distance meter circuit as recited in claim 1 wherein said first transmitter module includes a timer, said timer is started when the testing coded pulse is sent onto the power cable.

7. The coded time domain transmission distance meter circuit as recited in claim 6 wherein said first transmitter module includes a first receiver for receiving the receiver response coded pulse, said timer is stopped when the receiver response coded pulse is received.

8. The coded time domain transmission distance meter circuit as recited in claim 1 wherein said second receiver module includes a code checking function for checking the testing coded pulse, and said second receiver module sends the receiver response coded pulse to the first transmitter module when the testing coded pulse is correct.

9. The coded time domain transmission distance meter circuit as recited in claim 1 wherein said first transmitter module includes a code checking function for checking the receiver coded pulse, and said calculate distance function determines the round-trip elapsed time, subtracts the receiver latency time, and calculates the distance to the second receiver module when the receiver coded pulse is correct.

10. The coded time domain transmission distance meter circuit as recited in claim 9 wherein said calculate distance function applies said calculated distance data to said first code generator, said first code generator encoding said calculated distance data in a next testing coded pulse being transmitted to the receiver module.

11. The coded time domain transmission distance meter circuit as recited in claim 10 wherein said second receiver module includes a decoder, said decoder decodes the testing coded pulse for displaying the calculated distance.

12. A method for implementing coded time domain transmission distance metering comprising the steps of:
    connecting a first transmitter module to a cable at a first point;
    using said first transmitter module, generating a testing coded pulse; and sending the testing coded pulse onto the cable;
    connecting a second receiver module to the cable at a second point;
    using said second receiver module, receiving the testing coded pulse, generating a receiver response coded pulse; and sending the receiver response coded pulse onto the power cable to the transmitter module;
    using said first transmitter module, receiving the receiver response coded pulse, determining a round-trip elapsed time, subtracting a receiver latency time, and calculating a distance to the second receiver module.

13. The method for implementing coded time domain transmission distance metering as recited in claim 12 wherein said first transmitter module displays the calculating distance.

14. The method for implementing coded time domain transmission distance metering as recited in claim 13 wherein said first transmitter module encodes a next testing coded pulse to be transmitted with coded information representing the calculated distance.

15. The method for implementing coded time domain transmission distance metering as recited in claim 12 wherein said second receiver module decodes the testing coded pulse and displays the calculated distance.

16. The method for implementing coded time domain transmission distance metering as recited in claim 12 wherein said first transmitter module starts a timer when a testing coded pulse is sent onto the power cable, and stops the timer responsive to receiving the receiver response coded pulse.

17. A design structure tangibly embodied in a machine readable medium used in a design process, the design structure comprising:
    a coded time domain transmission distance meter circuit tangibly embodied in the machine readable medium used in the design process, said coded time domain transmission distance meter circuit including:
    a first transmitter module; said first transmitter module being connected to a cable at a first point;
    said first transmitter module including a first code generator for generating a testing coded pulse and a first transmitter coupled to said first code generator for sending the testing coded pulse onto the cable;
    a second receiver module; said second receiver module being connected to the cable at a second point;
    said second receiver module including a second receiver for receiving the testing coded pulse, a second code generator coupled to said second receiver for generating a receiver response coded pulse and a second transmitter coupled to said second code generator for sending the receiver response coded pulse to the first transmitter module; and said first transmitter module including a calculate distance function for determining a round-trip elapsed time, subtracting a receiver latency time, and calculating a distance to the second receiver module; wherein the design structure, when read and used in the manufacture of semiconductor chips produces a pair of semiconductor chips comprising said coded time domain transmission distance meter circuit.

18. The design structure of claim 17, wherein the design structure comprises a netlist, which describes said coded time domain transmission distance meter circuit.

19. The design structure of claim 17, wherein the design structure resides on storage medium as a data format used for the exchange of layout data of integrated circuits.

20. The design structure of claim 17, wherein the design structure includes at least one of test data files, characterization data, verification data, or design specifications.

* * * * *